United States Patent [19]

Southarewsky

[11] Patent Number: 5,759,314
[45] Date of Patent: Jun. 2, 1998

[54] BIAS TIRE HAVING CROWN REINFORCEMENT BETWEEN CARCASSES AND METHOD OF MAKING SAME

[75] Inventor: Alex Southarewsky, Huntersville, N.C.

[73] Assignee: Michelin Recherche et Technique S.A., Switzerland

[21] Appl. No.: 502,723

[22] Filed: Jul. 14, 1995

Related U.S. Application Data

[63] Continuation-in-part of Ser. No. 275,694, Jul. 15, 1994, abandoned.

[51] Int. Cl.$^6$ .............. B60C 9/02; B60C 9/04; B60C 9/06; B60C 9/22
[52] U.S. Cl. .............. 152/527; 152/454; 152/526; 152/531; 152/533; 152/534; 152/538; 152/545; 152/548; 152/550; 152/552; 152/553; 152/556; 152/558; 152/559; 152/DIG. 19; 156/123; 156/130.7; 156/133
[58] Field of Search ............... 152/197, 454, 152/526–527, 530–531, 533–534, 538, 545, 548–550, 552–553, 555–559, DIG. 19; 156/117, 123, 130, 133, 130.7

[56] References Cited

U.S. PATENT DOCUMENTS

| | | | |
|---|---|---|---|
| 1,023,666 | 4/1912 | Liais | 152/549 |
| 1,165,631 | 12/1915 | Seward, Jr. | 152/548 |
| 1,188,062 | 6/1916 | Gammeter | 152/531 X |
| 1,309,308 | 7/1919 | Swinehart | 152/526 |
| 1,386,599 | 8/1921 | Courvoisier | 152/558 |
| 1,779,391 | 10/1930 | Darrow | 156/133 |
| 2,348,350 | 5/1944 | McKelvey | 152/549 X |
| 2,388,421 | 11/1945 | Kraft et al. | 152/559 X |
| 2,982,328 | 5/1961 | Emanueli et al. | 152/531 X |
| 3,068,926 | 12/1962 | Jacob et al. | 152/538 X |
| 3,233,649 | 2/1966 | Jolivet et al. | 152/538 X |
| 3,620,279 | 11/1971 | Bartha et al. | 152/526 X |
| 3,685,564 | 8/1972 | Smithkey, Jr. | 152/526 X |
| 3,780,782 | 12/1973 | Jennings et al. | 152/526 |
| 4,050,973 | 9/1977 | Neville et al. | 156/123 |
| 4,098,315 | 7/1978 | Ferrell et al. | 156/123 X |
| 4,142,568 | 3/1979 | Kleijwegt . | |
| 4,342,351 | 8/1982 | Kuroda | 152/526 X |
| 4,506,718 | 3/1985 | Abe et al. | 152/559 X |
| 5,134,024 | 7/1992 | Carrier | 152/526 X |

FOREIGN PATENT DOCUMENTS

| | | | |
|---|---|---|---|
| 0484831 | 5/1992 | European Pat. Off. . | |
| 1008744 | 2/1952 | France . | |
| 1214031 | 4/1960 | France . | |
| 1276698 | 10/1961 | France | 152/526 |
| 1141551 | 12/1962 | Germany | 152/526 |
| 58-8406 | 1/1983 | Japan | 152/526 |
| 62-26102 | 2/1987 | Japan | 152/559 |

OTHER PUBLICATIONS

*Mechanics of Pneumatic Tires*, ed. Samuel Clark: U.S. Dept. of Transportation, Aug. 1981, pp. 225–229.
European Search Report.

*Primary Examiner*—Adrienne C. Johnstone
*Attorney, Agent, or Firm*—Alan A. Csontos; Robert R. Reed

[57] ABSTRACT

A bias tire includes a reinforcement member disposed between a first carcass and an additional carcass in the crown region of the tire for restricting the circumferential growth of the tire. The reinforcement member includes a plurality of cords oriented at zero degrees. The total circumferential strength of the reinforcement member is about 20 to 250% of the circumferential strength of the carcass plies. The reinforcement member, first carcass, and additional carcass are formed on a tire building drum as a green tire component in a method of making the tire.

10 Claims, 3 Drawing Sheets

BIAS TIRE HAVING CROWN REINFORCEMENT BETWEEN CARCASSES AND METHOD OF MAKING SAME

This is a continuation-in-part of application Ser. No. 08/275,694, filed on Jul. 15, 1994, now abandoned.

BACKGROUND OF THE INVENTION

The present invention relates to a bias tire having an improved tread wear capability and, more particularly, to a bias tire for an aircraft having an improved tread wear capability and reduced weight.

An aircraft tire must be capable of handling several diverse usage conditions such as, for example, relatively high centrifugal force loading at take-off and landing due to relatively high rotational speeds, impact loading, and relatively high internal pressures. Tires of a bias construction have shown themselves to be well suited for many aircraft tire applications. Typically, a bias tire, in its inflated profile, has a rounded transverse cross sectional shape which is further pronounced due to centrifugation—that is, the radially outward growth of a rotating tire caused by centrifugal forces.

While radial growth due to centrifugation is a normally anticipated phenomenon, centrifugation may cause disproportionately greater radial growth of some regions of the tire. For example, if the crown region of the bias tire grows disproportionately relative to the shoulder regions of the tire, the crown region may suffer excessive wear due to the correspondingly larger amount of contact which the crown region has with the surface on which the tire travels. This disproportionate loading leads to unacceptably rapid wear of the crown region of the tread and may, as well, create a condition in which less than optimum tire performance is seen.

One approach to restricting circumferential growth of the crown region of a bias tire includes providing a restricting structure under the tread. For example, U.S. Pat. No. 1,188,062 to Gammeter discloses a tire having a layer of rubberized cord wound circumferentially below the tread in the crown region of the tire and having longitudinally extending, inextensible fabric bands or cords. While this prior art configuration may limit growth of the tire circumferentially, the need still exists for a bias tire having the capability to limit or control crown region radial growth in a manner which both optimizes tire performance and permits a more efficient tire building process.

SUMMARY OF THE INVENTION

The present invention provides a bias tire which restricts radial growth in the crown region while not adversely impacting the tire performance. According to one aspect of the present invention, there is provided a bias ply tire comprising at least one pair of bead members, a pair of sidewall portions each being disposed on a respective side of a mid circumferential plane of the tire and having a bead member disposed therein, and a first carcass having at least one bias ply as well as at least one additional carcass. The tire also includes a circumferentially extending reinforcement member which enhances the ability of the tire to resist circumferential growth.

The additional carcass has at least one bias ply and the first and additional carcasses are each secured around a bead member in one respective sidewall portion and a bead member in the other sidewall portion. The first and additional carcasses each include a plurality of cords, the respective cords of each carcass all being disposed at the same bias angle relative to the mid circumferential plane. Additionally, in the one aspect of the present invention, each carcass has a lateral extent extending transversely of the mid circumferential plane on both sides thereof with the lateral extent of the additional carcass being radially outward of the lateral extent of the first carcass. Also, the tire includes a tread portion radially outward of the lateral extents of the first and additional carcass plies, the tread portion being connected through shoulder portions with the pair of sidewall portions.

The reinforcement member extends circumferentially of, and disposed radially intermediate, the lateral extents of the first and additional carcasses. The reinforcement member includes at least one non-metallic cord extending substantially parallel to the mid circumferential plane of the tire.

According to a further aspect of the tire of the present invention, the first and additional carcasses each include a plurality of cords, the respective cords of each carcass all being disposed at the same bias angle relative to the mid circumferential plane, the circumferential strength of the carcasses being:

$$ST_{tota}=ST_1+\ldots ST_n$$

and the individual circumferential strength of each carcass is $$ST_{1\ldots n}=\Sigma e_i t_i \cos alpha_i$$

where:

$\Sigma e_i$ is the number of cords $i_1 \ldots i_n$ per unit width of each carcass;

$t_i$ is the tensile strength of a cord i, and $alpha_i$ is the uniform bias angle of a cord i relative to the mid circumferential plane. The reinforcement member includes a plurality of cords, the circumferential strength of the reinforcement member being:

$$SB=e_{rm}t_{rm}$$

where:

$e_{rm}$ is the number of cords per unit width of the reinforcement member; and $t_{rm}$ is the cord tensile strength of the reinforcement member, and 0.20 ST<SB<1.50 ST. The circumferential strength SB of the reinforcement member in another embodiment of the invention is: 0.20 ST<SB<2.50 ST.

In an additional feature of the tire, the tread portion has a tread width as measured laterally perpendicular to the mid circumferential plane of the tire and the reinforcement member includes a pair of lateral side portions and a central portion disposed intermediate the lateral side portions, the cumulative circumferential strength of the reinforcement member being distributed such that at least about 50% of the circumferential strength is provided by the central portion of the reinforcement member, and the central portion of the reinforcement member being disposed substantially laterally coextensive with the middle third of the tread width.

In yet another feature of the tire, the cumulative circumferential strength of each of the lateral side portions of the reinforcement member progressively decreases in the laterally outward direction relative to the mid circumferential plane of the tire. Furthermore, the overall lateral extent of the reinforcement member is preferably less than about 75% of the tread width.

In further additional features of the tire, the reinforcement member includes a plurality of non-metallic cords extending circumferentially in generally parallel orientation to one another. The non-metallic cords are preferably in an arrangement having an overall lenticular cross-sectional shape. The arrangement of the non-metallic cords is preferably configured to define an upper laterally extending side and a lower laterally extending side radially inward of the upper side, the lower side having a lateral extent less than about 33% of the tread width and the upper side having a lateral extent less than about 75% of the tread width.

According to another aspect of the present invention, the bias tire is an aircraft tire comprising a second pair of bead members, each of the respective bead members in the second pair of bead members being disposed in a respective one of the pair of sidewall portions.

DETAILED DESCRIPTION OF THE PREFERRED EMBODIMENTS

Figure 1:
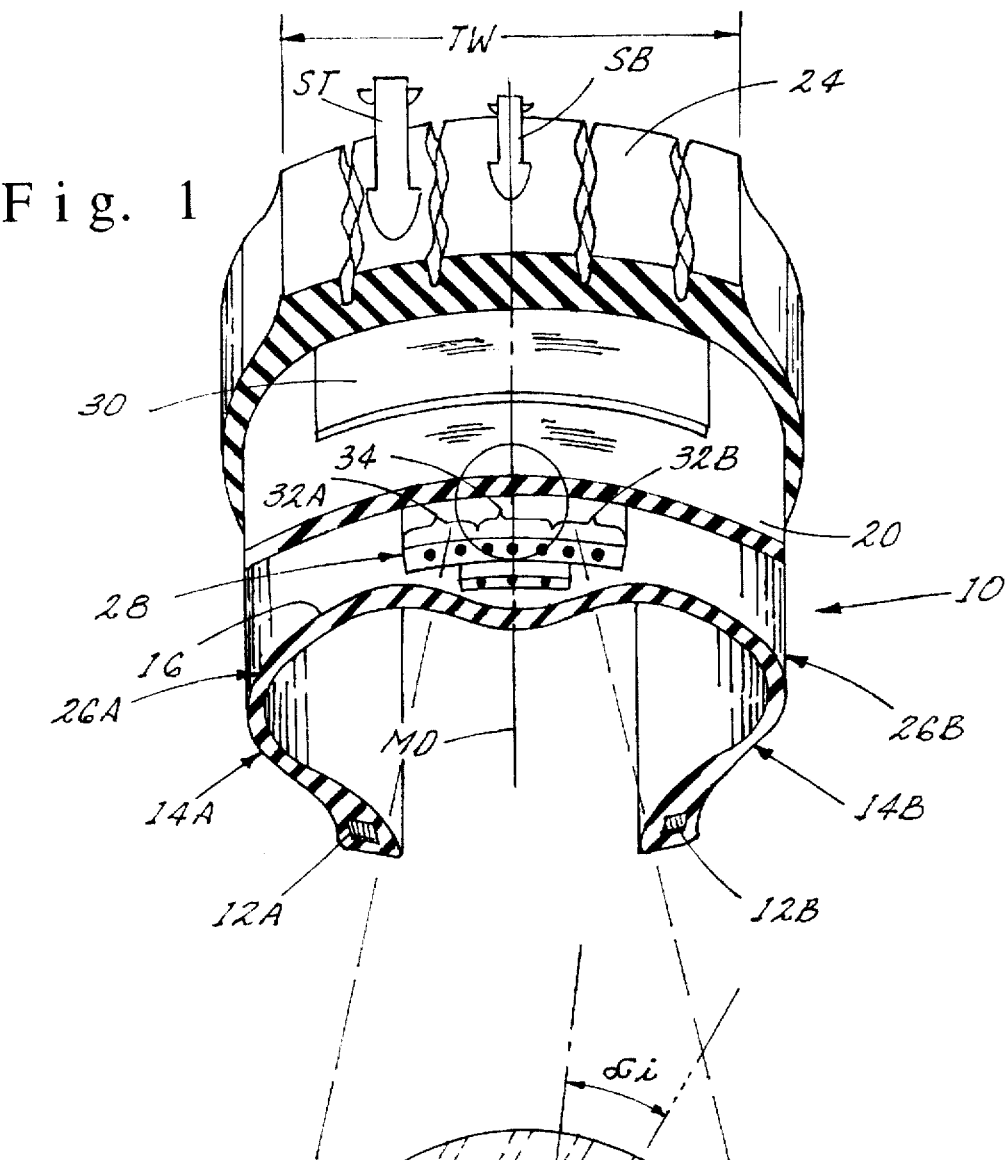
FIG. 1 is a cross-sectional perspective view of one preferred embodiment of the tire of the present invention, the tire being shown in a progressive cut-away manner to reveal the reinforcement member of the tire.
Figure 5:
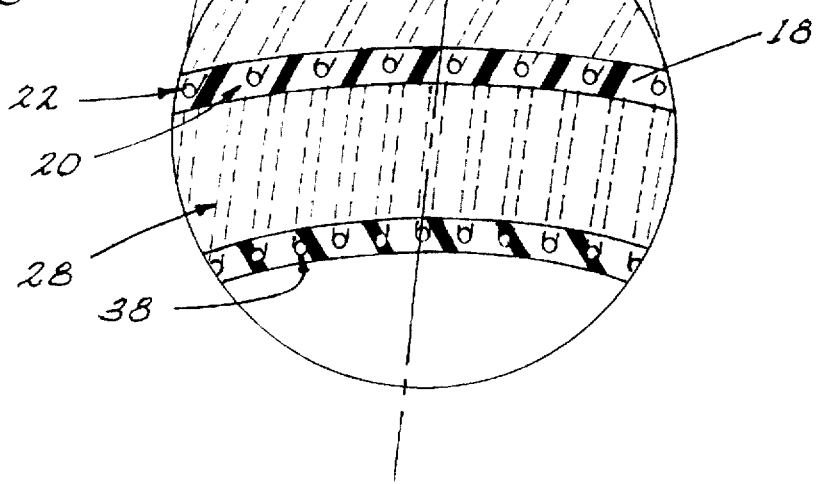
FIG. 5 is an enlarged perspective view of a portion of the one preferred embodiment of the tire shown in FIG. 1, showing in detail the orientation of the respective cords of the reinforcement member and a bias ply carcass of the tire.
Figure 2:
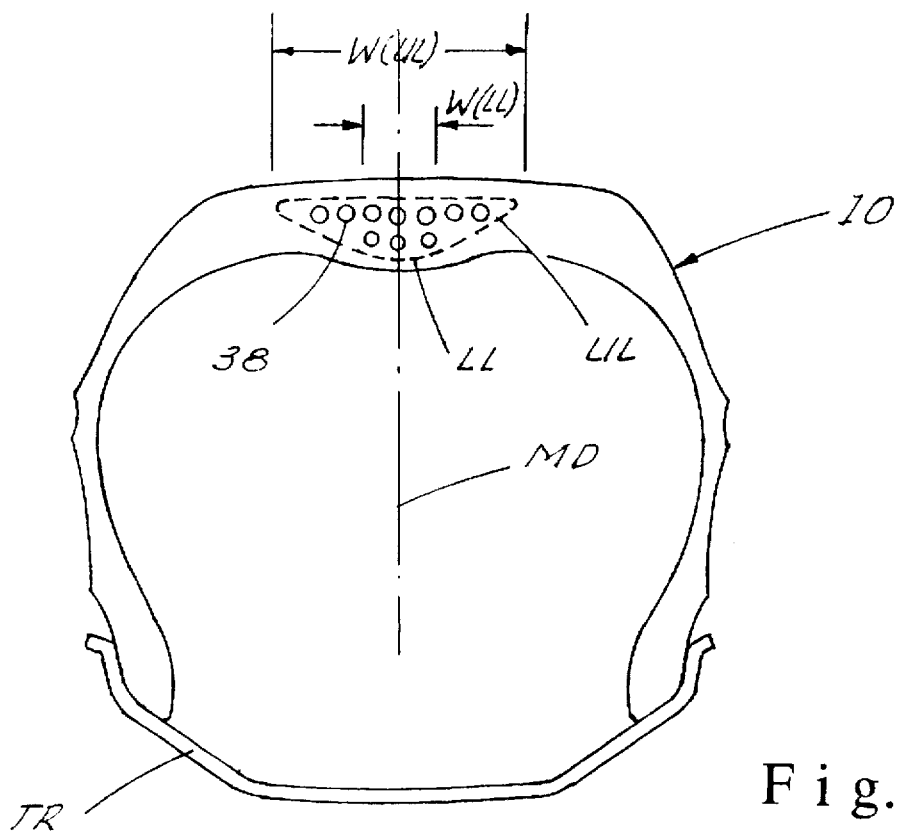
FIG. 2 is a vertical sectional view of the one preferred embodiment of the tire shown in FIG. 1.

As seen in FIGS. 1–5, in one preferred embodiment of a tire of the present invention, a tire 10 is of a bias ply construction and is adapted for mounting on a tire rim TR (as seen in FIG. 2) to provide therewith a complete tire and rim assembly. The tire 10 includes pair of bead members 12A, 12B, a pair of sidewall portions 14A, 14B each being disposed on a respective side of a mid circumferential plane MP of the tire and having a bead member disposed therein, a first carcass 16 and an additional carcass 20, the carcasses each having at least one ply 18 reinforced by a plurality of cords 22, as seen in FIG. 5. The first carcass 16 and the additional carcass 20 are each secured around the bead member 12A in the sidewall portion 14A and around the bead member 12B in the other sidewall portion 14B. Each carcass has a lateral extent extending transversely of the mid circumferential plane MD on both sides thereof with the lateral extent of the additional carcass 20 being radially outward of the lateral extent of the first carcass 16.

The tire 10 also includes a tread portion 24 radially outward of the lateral extents of the first and additional carcass plies. The tread portion 24 is connected through shoulder portions 26A, 26B with the pair of sidewall portions 14A, 14B, respectively.

The tire 10 additionally includes a reinforcement member 28 extending circumferentially of, and disposed radially intermediate, the lateral extents of the first and additional carcasses. As seen in FIG. 5, the reinforcement member 28 includes a plurality of non-metallic cords 38 extending parallel to one another and parallel to the mid circumferential plane MD of the tire. The tire 10 additionally includes a belt package 30 disposed intermediate the additional carcass 20 and the tread portion 24.

Figure 6:
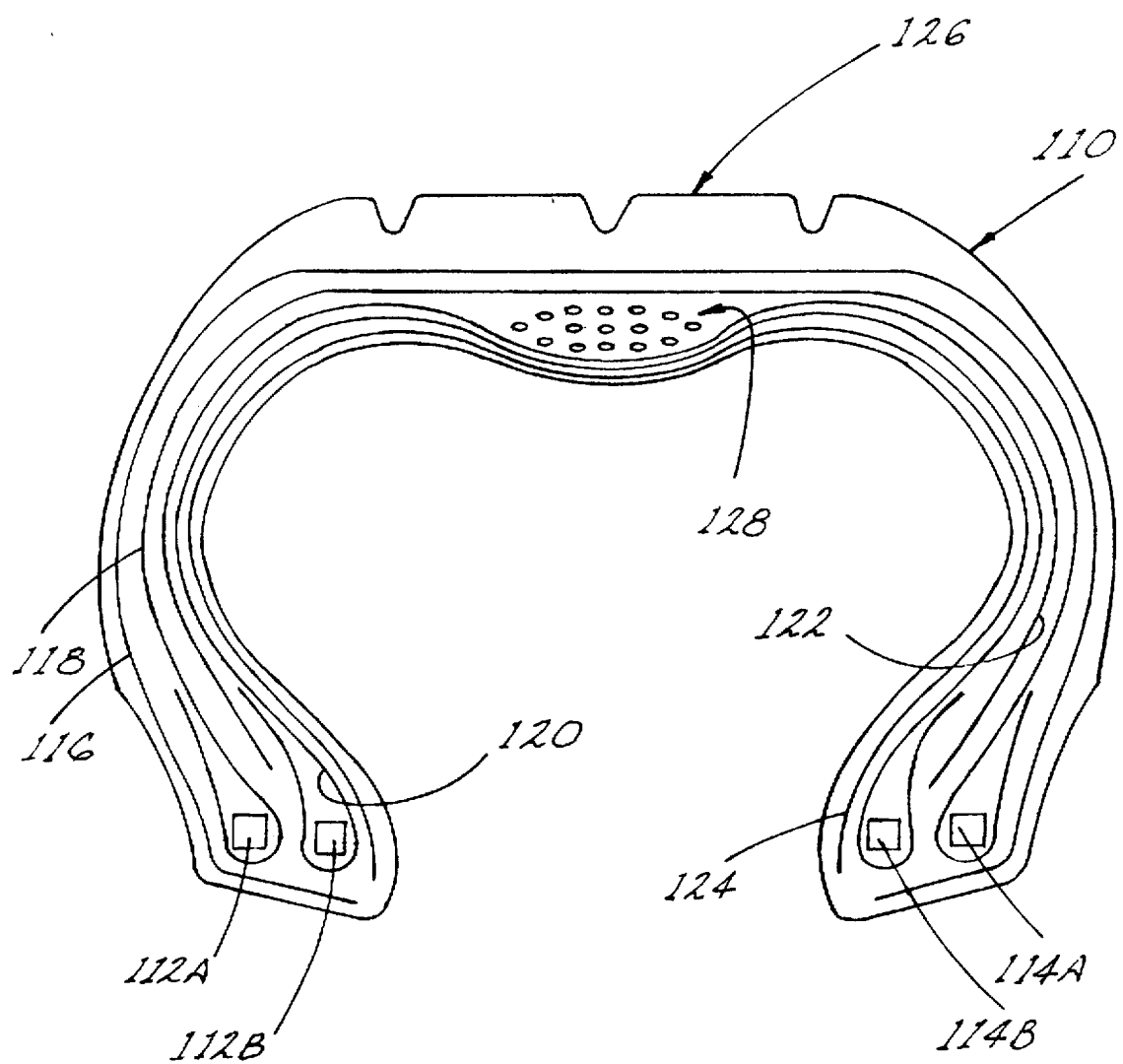
FIG. 6 is a vertical sectional view of another preferred embodiment of the tire of the present invention in which the tire includes two pairs of beads.

As seen in FIG. 6, in another preferred embodiment of the tire of the present invention, an aircraft tire 110 is of substantially the same general bias construction as the bias tire 10 illustrated in FIGS. 1–5 except the aircraft tire 110 additionally includes some tire features common to aircraft tires. Specifically, the tire 110 includes a first pair of bead members 112A, 112B and a second pair of bead members 114A, 114B, each respective pair of bead members being disposed on a respective side of a mid circumferential plane MD of the tire. The tire 110 also includes a first upper carcass 116 having a plurality of bias plies and a second upper carcass 118 having a plurality of bias plies. Each of the upper carcasses 116, 118 has an extent in the crown region of the tire which is substantially parallel to the axis of the tire.

The tire 110 further includes a lower carcass 120 having a plurality of bias plies, a first reinforcement insert 122 and a second reinforcement insert 124. A tread portion 124 is disposed radially outwardly of the lateral extents of the carcasses. The tire 110 additionally includes a crown region reinforcement member 128 extending circumferentially of, and disposed radially intermediate, the lateral extents of the radially innermost one of the upper carcasses 116, 118 and the lower carcass 120. The reinforcement member 128 includes a plurality of non-metallic cords extending parallel to one another and parallel to the mid circumferential plane MD of the tire.

As seen in FIG. 1, the bias plies of the first carcass 16 and the bias plies of the additional carcass 20 together have a total or cumulative circumferential strength ST as measured parallel to the mid circumferential plane MD of the tire. The reinforcement member 28 has a circumferential strength SB of between approximately 20 to 250 percent, and preferably between approximately 20 to 150 percent, of the total circumferential strength of the first and additional carcasses. This relationship of the circumferential strength of the reinforcement member 28 relative to the total circumferential strength of the first and additional carcasses is exemplarily illustrated in FIG. 5, in which it can be seen that each cord 22 of the additional carcass ply 20 is disposed at the same bias angle alpha relative to the mid circumferential plane MD whereas each cord 38 of the reinforcement member 28 is disposed parallel to the mid circumferential plane MD.

The total circumferential strength of the first carcass 16 and the additional carcass 20 may be described as follows:

$$ST_{total} = ST_1 + \ldots ST_n$$

in which the individual circumferential strength of each carcass $$ST_{1 \ldots n} = \Sigma e_i t_i \cos alpha_i$$

where:

$\Sigma e_i$ is the number of cords $i_1 \ldots i_n$ per unit width of each carcass;

$t_i$ is the tensile strength of a cord i, and $alpha_i$ is the uniform bias angle of a cord i relative to the mid circumferential plane. The reinforcement member includes a plurality of cords and the circumferential strength of the reinforcement member is:

$$SB = e_{rm} t_{rm}$$

where:

$e_{rm}$ is the number of cords per unit width of the reinforcement member; and $t_{rm}$ is the tensile strength of a cord of the reinforcement member, and 0.20 ST<SB<1.50 ST. The circumferential strength SB of the reinforcement member may also have a value according to the relationship 0.20 ST<SB<2.50 ST, depending upon the material properties of the reinforcing member.

The term "circumferential strength" is intended to mean the strength in tension of the particular tire component and is thus a measure of the ability of the particular tire component to resist radially outward growth.

The tread portion 24 has a tread width TW as measured laterally perpendicular to the mid circumferential plane MD of the tire which is a measurement of the lateral extent of that area of the tire 10 in contact with the surface at the nominal loaded condition of the tire. The reinforcement member 28 includes a pair of lateral side portions 30, 32 and a central portion 34 disposed intermediate the lateral side portions 32A, 32B and the non-metallic cords of the reinforcement member 28 are arranged in the lateral side portions 32A, 32B and the central portion 34 such that at least about 50% of the circumferential strength is provided by the central portion 34 of the reinforcement member 28. The central portion 34 of the reinforcement member 28 is disposed substantially laterally coextensive with the middle third of the tread width TW.

The cumulative circumferential strength of each of the lateral side portions 32A, 32B of the reinforcement member 28 progressively decreases in the laterally outward direction relative to the mid circumferential plane MD. The overall lateral extent of the reinforcement member 28 is less than about 75% of the tread width TW.

The modulus of elasticity of each non-metallic cord 38 is preferably at a value in the range of between 900 MPa to 7000 MPa and this value is preferably selected to be substantially equal to the modulus of elasticity of the cords of one of the bias plies 18 of the first carcass ply 16 or the cords of one of the bias plies 18 of the additional carcass ply 20. However, the tire manufacturing and tire performance advantages of the present invention are not solely limited to non-metallic cords having a preferred modulus of elasticity value. For example, a cord comprising aromatic polyamide such as may be obtained commercially under the registered trademark Kevlar may be best suited for a particular tire application although the modulus of elasticity of such a cord may lie outside the preferred modulus of elasticity range. Generally, it is believed that any non-metallic cord material should be acceptable so long as the elongation property of the reinforcing material is basically in the same range as that of the bias plies.

To obtain a cumulative circumferential strength SB of the reinforcement member 28 having the desired value relative to the value of the cumulative circumferential strength ST of the carcasses 16, 20, the reinforcement member 28 can be configured with any suitable selection of non-metallic cord materials, arrangement of the cords relative to one another, or overall assembled configuration of the reinforcement member 28 on the tire 10 itself. With regard to selection of a non-metallic cord material, nylon or polyester are preferred. Moreover, the cord material is preferably provided as a component of a reinforced ply and an example of a preferred configuration of such a reinforced ply is disclosed in U.S. Pat. No. 5,134,024 to Carrier.

Figure 3:
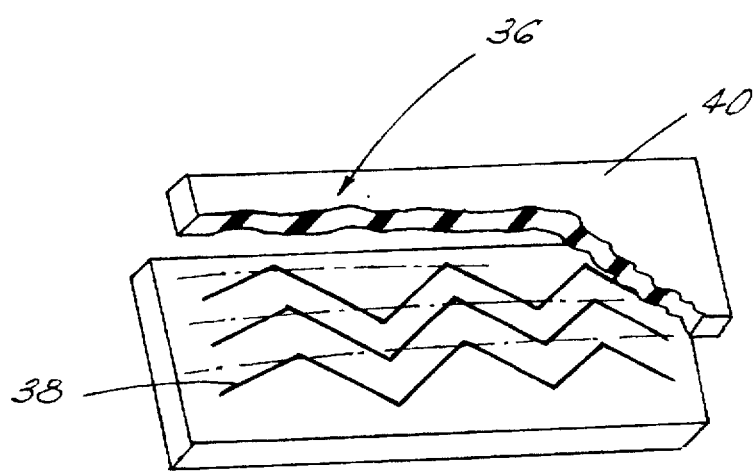
FIG. 3 is an exploded perspective view, in partial vertical section, of the reinforcement member of the tire shown in FIG. 1 prior to assembly of the reinforcement member onto the tire during a tire building process and showing the sinusoidal cords of the plies of the reinforcement member.
Figure 4:
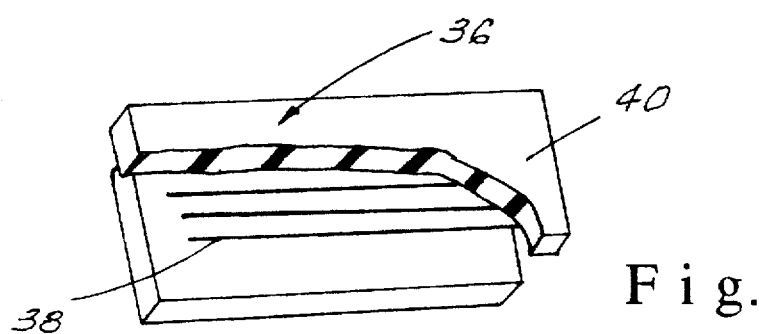
FIG. 4 is an exploded perspective view, in partial vertical section, of the reinforcement member of the tire shown in FIG. 1 after the reinforcement member has been assembled onto the tire during a tire building process and the tire has been disposed in a toroidal shape.

The preferred reinforced ply, as disclosed in the Carrier patent and as seen in FIGS. 3 and 4 hereof, has cords which, in an intermediate, not fully elongated state, have a longitudinal shape which may be referred to as "wavy" or "sinusoidal" or "chevron shaped". As seen in FIG. 3, the reinforcement member 28 is comprised one or more wraps of a reinforced ply 36 formed of a plurality of the cords 38 in an initial "chevron" shape disposed between a pair of rubber skims 40. The rubber skims 40 may themselves maintain the cords 38 in the desired initial "chevron" shape or another means such as a pick yarn arrangement may be used for this purpose. In any event, the cords 38 are maintained in a "chevron" shape in which each cord has a series of linear segments forming vertices with one another although the term "chevron" is to be understood to mean any cord geometry in which the cord is non-linear in one plane, such as the cord 38, or non-linear in more than one plane, such as a cord having an overall helical shape.

The choice of material of the cords 38, and the specifications of the material (such as denier, twist characteristic, amplitude, or tensile strength), must take into consideration the several transformations which the cords will undergo during the tire building process as well as the performance criteria that is desired for the reinforcement member 28 in the inflated cured tire. For example, the amplitude of the cords 38 (e.g., the spacing between two vertices connected by two linear segments which themselves form a third vertex) is preferably selected to accommodate the "lift" which occurs due to the change in diameter of a green or uncured tire after it has been cured into a cured tire. The "lift" phenomenon will cause further elongation of the cords 38 and, if too large an amplitude is selected, the cords 38 may be already elongated into their linear dispositions prior to curing so that, when the tire expands radially during curing, the cords will be placed in tension to such a degree that the elastic limit of the cords will be prematurely reached during tire use.

The "chevron" shape of the cords 38 disappears as the reinforced ply 36 is elongated such as occurs after the reinforced ply has been shaped into a toroidal shape. As seen in FIG. 4, when the reinforced ply 36 has been thus stretched or elongated, the cords 38 are correspondingly elongated and thereby transform from their "chevron" shape to a substantially linear shape. Moreover, the cord 38 in their substantially linear shape are oriented parallel to the longitudinal extent of the reinforced ply 36 50 that, upon assembly of the reinforced ply 36 onto the other tire components, the cords 38 extend parallel to the mid circumferential plane MD—that is, they are at a so-called zero degree bias.

It is also contemplated that other cord constructions may be employed in lieu of a "chevron" shaped cord. For example, the cord construction may feature a resiliently elongatable core made of rubber or another "stretch" type material and an outer covering enclosing the resiliently elongatable core such as, for example, a helically wound thread covering. In any event, a ply such as the reinforced ply 36 composed of cords which can be elongated without significant impairment of their tensile strength properties permits efficiencies to be achieved in the tire building process. For example, such a reinforced ply can be assembled with other tire components prior to shaping of the uncured tire into a toroidal shape while still providing the reinforcement benefit of a ply having cords extending substantially parallel or parallel to the mid circumferential plane of the tire.

As seen in FIG. 1, the reinforcement member 28 is preferably formed by several layers of the reinforced ply 36 which may be disposed on the underlying tire components by wrapping a single length of the reinforced ply several times about itself or, alternatively, placing several lengths of the reinforced ply in a process in which each length of the reinforced ply is cut and lapped after one or several wraps. As seen in FIG. 2, the reinforcement member 28 is preferably disposed between the belt package 30 which extends in the tread region of the tire 10 and the radially innermost one of the first carcass 16 and the additional carcass 20 and, most preferably, the reinforcement member 28 is in an intra-carcass disposition such as, for example, between the first carcass 16 and the additional carcass 20.

Additionally, while in some tire applications it may be desirable to dispose the reinforcement member 28 radially outward of all the carcasses, it is believed that, in particular in an aircraft tire application, such a disposition of the reinforcement member may subject the underlying carcasses to a radially inward force in the crown region of the tire and would tend to produce unacceptable stress on the carcasses in the shoulder regions of the tire. Accordingly, as seen in FIG. 5, the reinforcement member 128 is disposed between the two radially innermost carcasses 116 and 120.

With further reference to FIG. 2, it can be seen that the reinforcement member 28 preferably has, in the cured tire, an overall lenticular cross-sectional shape as defined by the reinforced plies 36 with a laterally extending upper side UL and a laterally extending lower side LL radially inward of the upper side UL. The lower side LL has a lateral extent less than about 33% of the tread width TW and the upper side UL has a lateral extent less than about 75% of the tread width. Moreover, the upper side UL has a lateral or width extent W(UL) which is preferably greater than the lateral or width extent W(LL) of the lower side and both the upper and lower sides are laterally centered (e.g., they are bisected by the mid circumferential plane MD).

The present invention also contemplates that the overall cross-sectional shape of the reinforcement member 28 (or of all of the reinforcement members, if additional reinforcement members are provided) need not necessarily be centered on the mid circumferential plane MD but may, instead, be in an off-center disposition. For example, if the tire 10 is specifically designed for use as an aircraft tire to be mounted on a type of landing gear which supports the tire at a significant camber angle, it may be desirable to construct the tire such that the cross-sectional shape of the reinforcement member 28 is at an offset from the mid-circumferential plane MD to thereby specifically compensate for asymmetric wear of the tire which will occur due to the significant camber position of the tire.

The overall lenticular shape of the reinforcement member 28 can be achieved by appropriate selection of the materials comprising the cords 38 and/or the rubber skims 40 and appropriate placement of the reinforced plies 36 during the tire building process. Also, the reinforcement member 28 preferably forms a part of the cured tire in such a manner that the upper side UL extends, in the crown region of the tire 10, radially inward of, and concentric to, the additional ply 20 with no radial displacement of the additional ply 20 (e.g., the ply 20 extends laterally beyond the reinforcement member 28 in opposite lateral directions at the same radial spacing from the tire axis) and the lower side LL extends radially outward of, and concentric to, a portion of the first ply 16 in the crown region of the tire which is displaced radially inwardly of the other portions of the first ply extending laterally beyond the lateral endpoints of the lower side. This cured tire configuration is preferred in that it reduces the extent to which the reinforcement member 28 exerts a radially outward force against the tread portion 24 in the crown region of the tire.

The reinforcement member 28 enhances the ability of the tire 10 to resist circumferential growth in the crown region of the tire by supplementing the circumferential growth restricting properties of the first carcass 16 and the additional carcass 20. The inherent tensile strength of the cords 38 acts to resist any force such as a radially outward force acting on the reinforcement member 28 and thereby impart to the reinforcement member 28 a circumferential growth restricting ability. The bias plies of the first carcass 16 and the additional carcass 20 also resist to some degree the radially outward forces and this resistance, together with the supplemental restraining action of the reinforcement member 28, prevents the crown region of the tire 10 from undesirable circumferential growth which would otherwise cause the tread portion 24 in the crown region to extend radially outwardly of the shoulders of the tire. In a tire with such a radially extended tread portion in the crown region, this radially extending tread portion would undesirably experience a disproportionately higher loading than the shoulder regions of the tread.

In comparison with radial tires, bias tires typically have a transverse profile in their inflated condition which is relatively closer to the "natural contour" of the tire. The transverse radius of the bias tire is thus relatively smaller than the transverse radius of a radial tire. However, the use of a crown reinforcement structure, such as the reinforcement member 28, permits a bias tire construction with a relatively greater transverse radius. The tire 10 of the present invention thus represents an improvement over conventional bias tires in that the improved tire exhibits a relatively greater transverse radius than conventional bias tires, thus leading to tread wear improvement and permitting the tire to be constructed with fewer carcass or belt plies and, thus, less weight.

I claim:

1. A bias ply tire comprising:

at least one pair of bead members;

a pair of sidewall portions each being disposed on a respective side of a mid circumferential plane of the tire and having a bead member disposed therein;

a first carcass having at least one bias ply of cords all disposed at the same bias angle relative to the mid-circumferential plane;

at least one additional carcass, each additional carcass having at least one bias ply of cords all disposed at the same bias angle relative to the mid-circumferential plane, at least the first carcass being anchored to a bead member in one respective sidewall portion and a bead member in the other sidewall portion and each carcass having a lateral extent extending transversely of the mid circumferential plane on both sides thereof with the lateral extent of each additional carcass being radially outward of the lateral extent of the first carcass;

a tread portion radially outward of the lateral extents of the first and additional carcasses, the tread portion being connected through shoulder portions with the pair of sidewall portions; and a circumferentially extending reinforcement member disposed radially intermediate the lateral extents of the first and additional carcasses, the reinforcement member including at least one non-metallic cord extending substantially parallel to the mid circumferential plane of the tire wherein the bias plies of the first and additional carcasses have a total circumferential strength as measured parallel to the mid circumferential plane of the tire defined by $$ST_{total} = ST_1 + \ldots ST_n$$

with the individual circumferential strength of each carcass defined by $$ST_{1\ldots n} = \Sigma e_i t_i \cos \text{alpha}_i$$

where $\Sigma e_i$ is the number of cords $i_1 \ldots i_n$ per unit width of each carcass, $t_i$ is the tensile strength of a cord i, and $\text{alpha}_i$ is the uniform bias angle of a cord i relative to the mid circumferential plane; the reinforcement member has a circumferential strength defined by $$SB = e_{rm} t_{rm}$$

where $e_{rm}$ is the number of cords per unit width of the reinforcement member and $t_{rm}$ is the cord tensile strength of the reinforcement member; and the reinforcement member circumferential strength is between approximately 20 to 250% of the total circumferential strength of the first and additional carcasses.

2. A bias ply tire comprising:

at least one pair of bead members;

a pair of sidewall portions each being disposed on a respective side of a mid circumferential plane of the tire and having a bead member disposed therein;

a first carcass having at least one bias ply of cords all disposed at the same bias angle relative to the mid-circumferential plane;

at least one additional carcass, each additional carcass having at least one bias ply of cords all disposed at the same bias angle relative to the mid-circumferential plane, at least the first carcass being anchored to a bead member in one respective sidewall portion and a bead member in the other sidewall portion and each carcass having a lateral extent extending transversely of the mid circumferential plane on both sides thereof with the lateral extent of each additional carcass being radially outward of the lateral extent of the first carcass;

a tread portion radially outward of the lateral extents of the first and additional carcasses, the tread portion being connected through shoulder portions with the pair of sidewall portions; and a circumferentially extending reinforcement member disposed radially intermediate the lateral extents of the first and additional carcasses, the reinforcement member including at least one non-metallic cord extending substantially parallel to the mid circumferential plane of the tire wherein the bias plies of the first and additional carcasses have a total circumferential strength as measured parallel to the mid circumferential plane of the tire defined by $$ST_{total} = ST_1 + \ldots ST_n$$

with the individual circumferential strength of each carcass defined by $$ST_{1\ldots n} = \Sigma e_i t_i \cos \text{alpha}_i$$

where $\Sigma e_i$ is the number of cords $i_1 \ldots i_n$ per unit width of each carcass, $t_i$ is the tensile strength of a cord i, and $\text{alpha}_i$ is the uniform bias angle of a cord i relative to the mid circumferential plane; the reinforcement member has a circumferential strength defined by $$SB = e_{rm} t_{rm}$$

where $e_{rm}$ is the number of cords per unit width of the reinforcement member and $t_{rm}$ is the cord tensile strength of the reinforcement member; and the reinforcement member circumferential strength is between approximately 20 to 150% of the total circumferential strength of the first and additional carcasses.

3. A bias ply tire according to claim 2 wherein the tread portion has a tread width as measured laterally perpendicular to the mid circumferential plane of the tire and the reinforcement member includes a pair of lateral side portions and a central portion disposed intermediate the lateral side portions the total circumferential strength of the reinforcement member being distributed such that at least about 50% of the circumferential strength is provided by the central portion of the reinforcement member, the central portion of the reinforcement member being disposed substantially laterally coextensive with the middle third of the tread width.

4. A bias ply tire according to claim 3 wherein the total circumferential strength of each of the lateral side portions of the reinforcement member progressively decreases in the laterally outward direction relative to the mid circumferential plane of the tire.

5. A bias ply tire according to claim 4 wherein the overall lateral extent of the reinforcement member is less than about 75% of the tread width.

6. A bias ply tire according to claim 2 wherein the at least one non-metallic cord included in the reinforcement member is a plurality of non-metallic cords.

7. A bias ply tire according to claim 6 wherein the non-metallic cords are in an arrangement having an overall lenticular cross-sectional shape.

8. A bias ply tire according to claim 7 wherein the non-metallic cords are arranged to define an upper laterally extending side and a lower laterally extending side radially inward of the upper side and extending generally parallel thereto, the lower side having a lateral extent less than about 33% of the tread width and the upper side having a lateral extent less than about 75% of the tread width.

9. A bias ply tire according to claim 6 wherein the modulus of elasticity of each non-metallic cord is substantially equal to the modulus of elasticity of the cords of a carcass ply.

10. A bias ply tire according to claim 2 wherein the tire is an aircraft tire and further comprising a second pair of bead members, each of the respective bead members in the second pair of bead members being disposed in a respective one of the pair of sidewall portions.

* * * * *